United States Patent [19]

Olsen

[11] Patent Number: 4,679,826
[45] Date of Patent: Jul. 14, 1987

[54] HIGH PRESSURE HOSE FITTING

[75] Inventor: John H. Olsen, Vashon, Wash.

[73] Assignee: Flow Industries, Inc., Kent, Wash.

[21] Appl. No.: 731,113

[22] Filed: May 6, 1985

[51] Int. Cl.⁴ .............................................. F16L 39/00
[52] U.S. Cl. .................................. 285/149; 285/353; 285/384; 285/385
[58] Field of Search ............... 285/149, 353, 384, 385, 285/421

[56] References Cited

U.S. PATENT DOCUMENTS

| | | | |
|---|---|---|---|
| 1,651,022 | 11/1927 | Fulton | 285/149 |
| 2,277,397 | 3/1942 | Graham | 285/8 |
| 2,383,733 | 8/1945 | Parker . | |
| 2,394,632 | 2/1946 | Parker | 285/149 |
| 2,490,686 | 12/1949 | Guarnaschelli | 285/149 |
| 2,610,869 | 9/1952 | Allison | 285/86 |
| 2,741,496 | 4/1956 | Melson | 285/84 |
| 2,753,196 | 7/1956 | Melson | 285/149 |
| 3,306,637 | 2/1967 | Press et al. | 285/149 |
| 3,576,334 | 4/1971 | Hemens | 285/149 |
| 3,675,951 | 7/1972 | Morin | 285/149 |
| 4,163,573 | 8/1979 | Yano | 285/174 |
| 4,323,089 | 4/1982 | Kadono et al. | 138/109 |
| 4,453,747 | 6/1984 | Bimba | 285/305 |

FOREIGN PATENT DOCUMENTS

| | | | |
|---|---|---|---|
| 2501108 | 7/1965 | Fed. Rep. of Germany | 285/149 |
| 2613551 | 10/1977 | Fed. Rep. of Germany . | |
| 353588 | 5/1961 | Switzerland | 285/149 |
| 891611 | 3/1962 | United Kingdom . | |
| 968174 | 8/1964 | United Kingdom | 285/149 |
| 1065480 | 4/1967 | United Kingdom | 285/149 |
| 1334095 | 10/1973 | United Kingdom . | |
| 631739 | 11/1978 | U.S.S.R. | 285/149 |

Primary Examiner—Cornelius J. Husar
Assistant Examiner—Anthony Knight
Attorney, Agent, or Firm—Flehr, Hohbach, Test, Albritton & Herbert

[57] ABSTRACT

A high pressure hose fitting which includes a crimpable sleeve for use over a hose and a conical ferrule that separates the cord layer of the hose from the inner linings and clamps the cord layer ot the sleeve. A housing enclosed the fitting and provides the clamping force. An O-ring between the ferrule and the housing aids in sealing. All parts are so designed that an increase in pressure increases the sealing force and clamping force.

6 Claims, 2 Drawing Figures

HIGH PRESSURE HOSE FITTING

FIELD OF INVENTION

This invention pertains to hose fittings, particularly, to ultra high pressure hose fittings for use at pressures over 10,000 psi, with still greater particularity to ultra high pressure hose fittings for use with wire or fiber reinforced hose.

BACKGROUND OF INVENTION

In water jet cutting and other high pressure fluid applications it is often desirable to use flexible hose to convey the fluid. In applications where the pressure is ultra high as in those over 10,000 pounds per square inch, the hose is commonly constructed of a plastic liner surrounded by multiple layers of reinforcing material. Hose fittings are required to attach such a hose to another hose or to equipment such as intensifiers or nozzles.

An ultra high pressure hose fitting normally includes a barbed nipple which is pressed inside the liner tube of the hose. An outer sleeve is then swagged over the reinforcing layers of the hose and the nipple. The hose is thus clamped between the nipple and the sleeve and the nipple is held by the sleeve against axial motions. As pressure is applied to the hose a force is generated that tends to separate the barbed nipple from the hose permitting a leak. This tendency is resisted by the clamping force exerted by the sleeve. When the pressure is very high the clamping force must be increased. If the nipple is not increased in thickness it will be collapsed by the clamping force when high pressure is not present, when, for example, the intensifier is off. The thickening of the nipple results in a constriction of the bore at the fitting. The constriction produced becomes the limiting factor in the carrying capacity of the hose. Accordingly, a demand exists for an ultra high pressure hose fitting which does not constrict the hose but is able to withstand pressures in excess of 10,000 psi.

SUMMARY OF THE INVENTION

The invention provides an ultra high pressure hose fitting which does not constrict the hose. The fitting is comparable in cost and complexity to present fittings.

The invention includes a sleeve which may be swagged to the reinforcing layers of the hose which are flared away from the liner by a conical ferrule. The ferrule also surrounds the liner but does not obstruct the flow path. A housing surrounds the device and provides the proper preloads. An O-ring seals to the housing and the hose liner to prevent leakage. The fitting is so designed that the pressure present in the hose increases the sealing and retention forces. This structure is particularly useful at pressures between 10,000 and 100,000 psi and even higher.

DETAILED DESCRIPTION OF THE DRAWINGS

Figure 1:
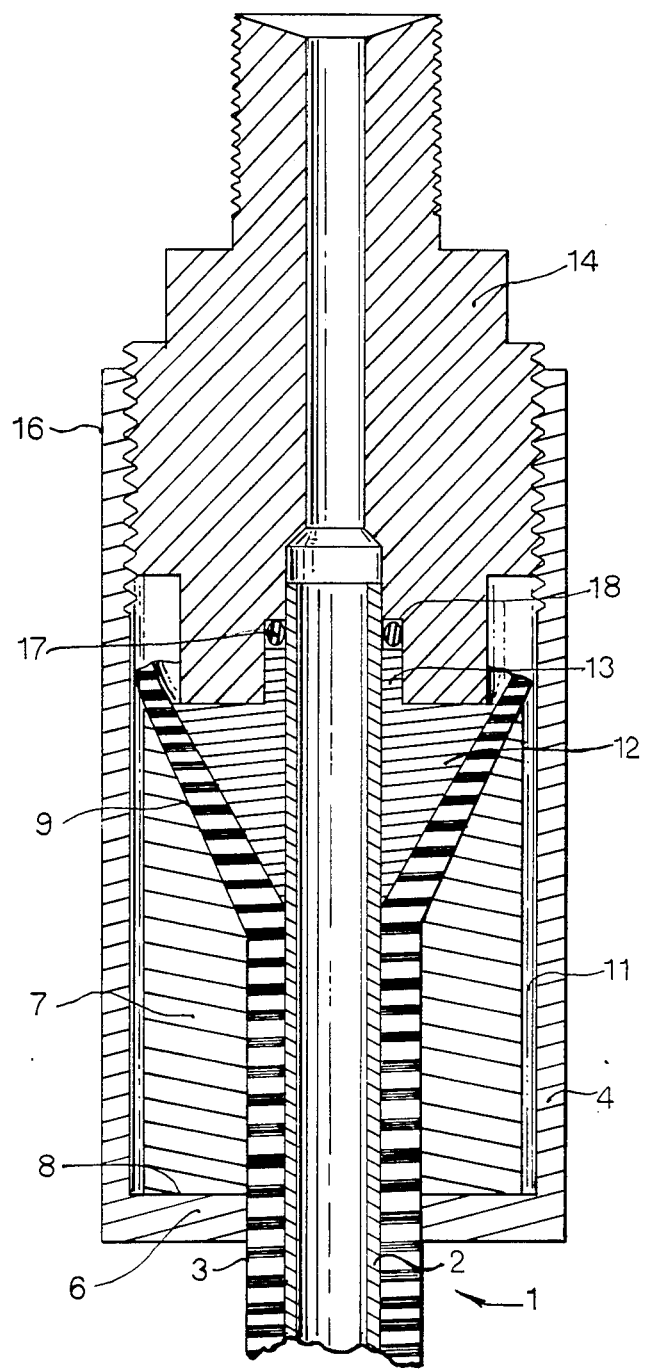
FIG. 1 is a section elevation view of the invention.

FIG. 1 is a section elevation view of the invention through a centerline. It is understood that all parts are symmetrical around the centerline unless otherwise indicated. A hose 1 having an inner lining 2 and reinforcing cords 3 enters the outer housing 4 at one end 6. Hose 1 is the type used in ultra high pressure applications which usually includes a plastic liner 2 around which are wound cords of reinforcing material of either metal wire or high strength fibre. Upon entering housing 4 hose 1 is surrounded by a crimped sleeve 7 which is lightly swagged to reinforcing cords 3. Alternately, sleeve 7 could be fastened by an other method which assures intimate contact between the hose outside and the sleeve bore. Sleeve 7 is flat at one end 8 which is butted up against end 6 of housing 4 and tapered internally at the other end 9. A gap 11 or at least a sliding interface remains between the outer surface of sleeve 7 and the inner surface of housing 6. Cords 3 of hose 1 are flared away from liner 2 and pass over a conical ferrule 12. A cone half angle of 20 degrees has been used successfully but other angles may be equally useful. Ferrule 12 is a hollow conical member with a projection 13. An outlet fitting 14 is threadably attached to the other end 16 of housing 6. When outlet fitting 14 is rotated into housing 6 ferrule 12 is pushed against cords 3 clamping cords 3 into place. Housing 4 reacts against sleeve 7 to prevent slippage of sleeve 7. An O-ring 17 is situated between projection 13 of ferrule 12, the outside of liner 2 and a cavity 18 in outlet fitting 14. O-ring 17 seals liner 2 against leakage to the outside. Extrusion of O-ring 17 is prevented by projection 13 of ferrule 12. Projection 13 expands outward toward housing 14 when high pressure is present inside liner 2 closing any extrusion gaps.

In operation, as pressure inside liner 2 is increased, all sealing and holding forces increase as well. The interface force between sleeve 7 and reinforcing cords 3 increases as pressure tries to swell hose 1. This, in turn, increases the frictional forces tending to hold the fitting to hose 1. The increase in pressure also forces liner 2 more tightly against the interior of ferrule 12 assuring a liquid tight seal. Finally, the pressure presses projection 13 of ferrule 12 against the interior of outlet 14 providing a minimum gap to prevent extrusion of O-ring 17. Parts 4, 7, 12 and 14 would normally be constructed of metal chosen for strength consistent with the forces present.

Figure 2:
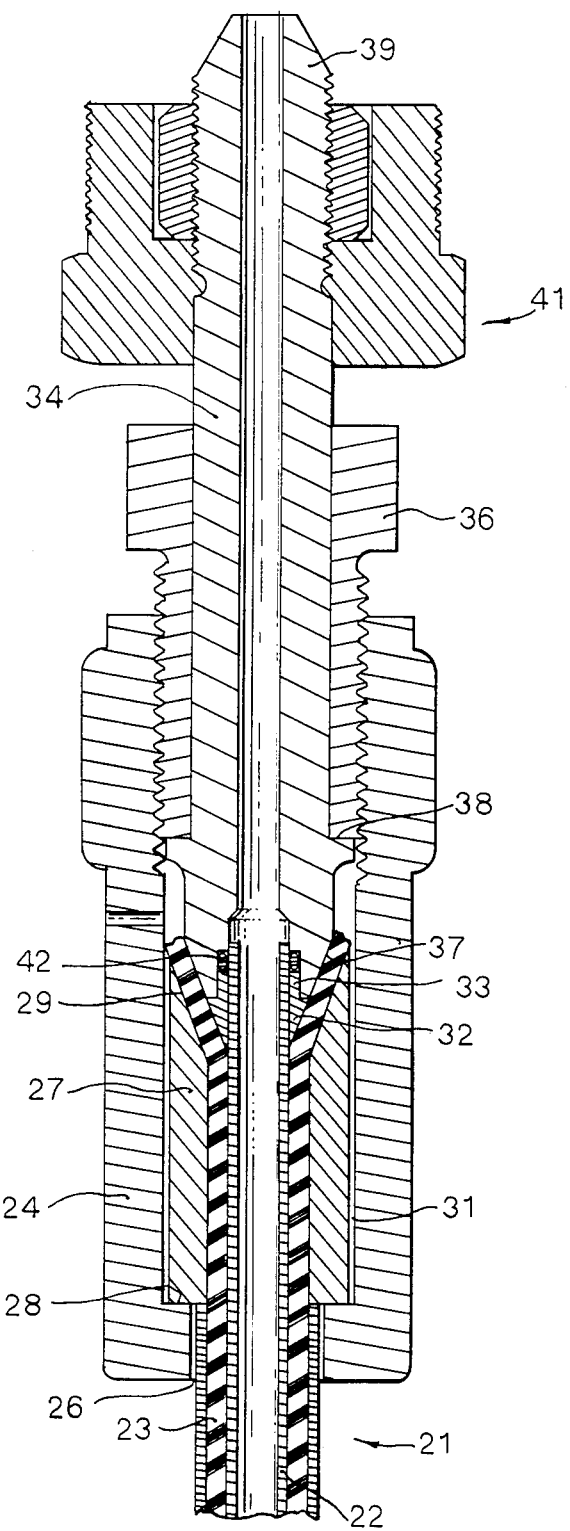
FIG. 2 is a section elevation view of a second embodiment of the invention.

FIG. 2 is a section elevation view of a second embodiment of the invention through a centerline. It is understood that all parts are symmetrical around the centerline unless otherwise indicated. A hose 21 having an inner lining 22 and reinforcing cords 23 enters the outer housing 24 at one end 26. Hose 21 is the type used in ultra high pressure applications which usually includes a plastic liner 22 around which are wound cords of reinforcing material of either metal wire or high strength fibre. Upon entering housing 24 hose 21 is surrounded by a crimped sleeve 27 which is lightly swagged to reinforcing cords 23. Alternately, sleeve 27 could be fastened by any other method which assures intimate contact between the hose outside and the sleeve bore. Sleeve 27 is flat at one end 28 which is butted up against end 26 of housing 24 and tapered internally at the other end 29. A gap 31 or at least a sliding interface remains between the outer surface of sleeve 27 and the inner surface of housing 26. Cords 23 of hose 21 are flared away from liner 22 and pass over a conical ferrule 32. A cone half angle of 20 degrees has been used successfully but other angles may be equally useful. Ferrule 32 is a hollow conical member with a projection 33. An outlet conduit 34 is situated within housing 24 and is urged toward end 26 of housing 24 when a compression nut 36 is tightened. Nut 36 is threadably attached to housing 24. Conduit 34 includes a tapered surface 37 which aids in compression of cords 23 and a step 38 to receive the force applied by nut 36. The other end 39 of conduit 34 terminates in a fitting 41 for attachment to another hose or accessory (not shown). Housing 24 reacts against sleeve 27 to prevent slippage of sleeve 27. An O-ring 42 is situated between projection 33 of ferrule 32, the outside of liner 22 and a cavity 43 in conduit 34. O-ring 42 seals liner 22 against leakage to the outside. Extrusion of O-ring 42 is prevented by projection 33 of ferrule 32. Projection 33 expands outward against conduit 34 when high pressure is present inside liner 22 closing any extrusion gaps.

In operation, as pressure inside liner 22 is increased, all sealing and holding forces increase as well. The interface force between sleeve 27 and reinforcing cords 22 increases as pressure tries to swell hose 21. This, in turn, increases the frictional forces tending to hold the fitting to hose 21. The increase in pressure also forces liner 22 more tightly against the interior of ferrule 32 assuring a liquid tight seal. Finally, the pressure presses projection 33 of ferrule 32 against the interior of conduit 34 providing a minimum gap to prevent extrusion of O-ring 42. Parts 24, 27, 32, 34 and 36 would normally be constructed of metal chosen for strength consistent with the forces present.

The embodiments shown are illustrative only, the invention being defined solely by the claims attached:

I claim:

1. A high pressure hose fitting for use in combination with a hose having an inner lining which is encircled by a layer of reinforcing cords and which defines the internal passageway of the hose, said hose fitting comprising:
   an end portion of said hose, said end portion including an end segment of said inner lining and a corresponding end segment of said layer of reinforcement cords which has a lengthwise end section thereof separated from a lengthwise end section of said lining end segment, the latter being disposed in direct communication with said hose passageway along its entire extent and being constructed of a material such that high pressure within said passageway will cause it to swell outwardly to a limited extent;
   a cylindrical housing having an opening for admission of said hose end portion at one end and a threaded opening at the other end for receiving an outlet fitting in a thread connected manner;
   an outlet fitting threadably connected to said housing, said outlet fitting having a hollow interior for admission of and sealing to the liner end segment of said hose and a recess extending around the outside of said liner end segment;
   a crimped sleeve disposed within said housing in intimate contact with the outside surface of the end segment of said cords layer, one end of said sleeve being disposed adjacent to the one end of said housing and defining a conical recess at its other end for gripping to and receiving the end segment of said cords layer;
   a conical, barbless ferrule having a hollow interior for receiving and sealing to the exterior of said inner liner end section of said liner end segment and a conical outer suface for clamping the separated end section of said cords layer of said hose end portion to the conical recess of said sleeve, said ferrule also including a projection which is expandable to a limited extent and which is located adjacent to the recess of said outlet fitting for sealing to said outlet fitting; and
   an O-ring between said projection of said ferrule and said outlet fitting for sealing said outlet fitting to said ferrule.

2. A high pressure hose fitting for use in combination with a hose having an inner lining which is encircled by a layer of reinforcing cords and which defines the internal passageway of the hose, said hose fitting comprising:
   an end portion of said hose including an end segment of said inner lining and a corresponding end segment of said layer of reinforced cords which has a lengthwise end section thereof separated from a lengthwise end section of said lining end segment, the latter being disposed in direct communication with said hose passageway along its entire extent and being constructed of a material such that high pressures within said passageway will cause it to swell outwardly to a limited extent;
   means surrounding said hose end portion for engaging the outer surface of said cords layer end segment including the outer surface of its lengthwise end section;
   a conical, barbless ferrule having a hollow interior for receiving and sealing to the exterior surface of the lengthwise end section of said lining end segment and a conical outer surface for engaging against the inner surface of the lengthwise end section of said cords layer end segment;
   means including an outlet fitting engaging both said barbless ferrule and an endmost part of the lengthwise section of said lining end segment; and
   an O-ring disposed around the lengthwise end section of said lining end segment between said ferrule and said outlet fitting for providing a seal thereat.

3. A high pressure according to claim 2 wherein said means surrounding said hose end portion includes a housing for containing said hose end portion and means separate from and within said housing serving as said means engaging the outer surface of said cords layer end segment, said housing and said outlet fitting including cooperating means for thread connecting the two together in a way which causes the outlet fitting to engage both said ferrule and said O-ring.

4. A high pressure fitting according to claim 3 wherein said housing and said separate means engaging the outer surface of said cords layer end segment are configured so that the latter means is slidable within said housing when there is ambient pressure within the hose end section.

5. A high pressure hose fitting according to claim 2 wherein said barbless ferrule includes a projection which is expandable to a limited extent and which engages against one side of said O-ring, said projection and said outlet fitting together defining an annular recess for containing said O-ring.

6. A high pressure hose fitting according to claim 2 wherein said inner lining end segment is constructed of plastic and wherein said means engaging the outer surface of said cords layer end segment, said ferrule and said outlet fitting are constructed of metal.

* * * * *